United States Patent
Arnold et al.

(10) Patent No.: US 7,796,534 B1
(45) Date of Patent: Sep. 14, 2010

(54) TRUNK HEALTH MONITORING FOR TELECOMMUNICATIONS NETWORK

(75) Inventors: George Hutchinson Arnold, Lenexa, KS (US); Hima Diwakar Parimisetty, Overland Park, KS (US); Dahl Brougham Metters, Shawnee Mission, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1089 days.

(21) Appl. No.: 11/144,260

(22) Filed: Jun. 3, 2005

(51) Int. Cl.
*H04L 12/28* (2006.01)

(52) U.S. Cl. .................. 370/254; 370/242; 370/252; 709/220; 709/224; 715/808; 715/838; 715/853

(58) Field of Classification Search .............. 370/242, 370/252, 254, 255; 709/220, 224; 715/711, 715/715, 734, 735, 739, 763, 771, 778, 783, 715/808, 810, 835, 838, 853, 854
See application file for complete search history.

(56) References Cited

U.S. PATENT DOCUMENTS

| | | | |
|---|---|---|---|
| 6,636,486 B1 * | 10/2003 | Magloughlin ............... 370/252 |
| 6,792,269 B2 | 9/2004 | Boehmke |
| 6,975,330 B1 * | 12/2005 | Charlton et al. ............. 345/593 |
| 2001/0054097 A1 * | 12/2001 | Chafe ........................ 709/224 |
| 2003/0172153 A1 * | 9/2003 | Vaver ........................ 709/224 |
| 2004/0168115 A1 * | 8/2004 | Bauernschmidt et al. .... 715/500 |
| 2004/0240385 A1 | 12/2004 | Boggs et al. |

* cited by examiner

*Primary Examiner*—Ian N Moore
*Assistant Examiner*—Peter Cheng

(57) ABSTRACT

Trunks in a telecommunications network are monitored. Out-of-service data is gathered from each respective switch corresponding to a current time period for a plurality of trunks connected to the respective switch. Switches that have at least one out-of-service trunk are detected in response to the gathered data. A first plurality of graphic elements is displayed via a web page corresponding to respective switches, wherein each switch detected as having an out-of-service trunk is displayed with a distinguishing visual characteristic. One of the first graphic elements is manually selected for a selected switch. Second graphic elements are displayed for respective trunk groups corresponding to the selected switch, each second graphic element having a respective size proportional to a current number of call attempts directed to the respective trunk group during the current time period and having a color indicative of a health index of the respective trunk group.

21 Claims, 4 Drawing Sheets

TRUNK HEALTH MONITORING FOR TELECOMMUNICATIONS NETWORK

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to trunk performance monitoring in a telecommunications network, and, more specifically, to a tool for assisting network monitoring personnel to rapidly detect trunk failures in a manner that highlights the failures which have the greatest affect on network performance.

Telecommunications systems such as the public switched telephone network and cellular wireless networks include switches for forwarding traffic to the appropriate destinations. The communication channels for carrying traffic between switches are known as trunks. Trunks may interconnect switches to other switches or to other traffic nodes such as a base station controller in a wireless cellular system.

Trunks are also sometimes referred to as circuits. As used herein, trunk refers to any single transmission channel between two points. A trunk group is two or more trunks that connect the same two points (e.g., switches or nodes) and are connected in such a way that if a call is routed to the trunk group and a free circuit is available in the trunk group, then the call will be routed on the free circuit. The trunk groups included in a network are laid out between the switches and nodes in a quantity that provides the capacity needed to optimally handle traffic loads experienced within the network. When trunks fail for any reason (e.g., such as the result of a hardware fault) the overall traffic carrying capacity is reduced and may result in blocked calls. A control center is provided within the telecommunications network for monitoring trunk failures so that traffic can be rerouted as necessary and steps can be taken to repair the failures.

Each trunk circuit is typically implemented as part of a DS-1 span which is a plurality of circuits that are multiplexed together into one digital signal for transport between switches. Each DS-1 span includes 24 circuits. A failure may affect a single circuit or an entire DS-1 span. During operation, a switch keeps track of the aggregate total time that circuits are out of service over given periods (e.g. each half hour).

Trunk failures have typically been monitored by control center technicians by inspecting log messages and/or alarm messages that are transmitted by the switches to the control center. However, this has required technicians to sort through massive amounts of other log and alarm messages. Consequently, the response time to detect and address trunk failures is slow and such failures are often not even noticed at the time the first log or alarm messages appear. Therefore, it would desirable to reduce the burden on technicians for monitoring trunk health and to speed up the detection of trunk failures.

SUMMARY OF THE INVENTION

The present invention has the advantage of quickly and easily checking the trunk health status of any desired switch in a network. A network software tool is provided that allows a technician to easily find those trunk failures which most greatly impact network performance.

In one aspect of the invention, a method is provided for monitoring trunks in a telecommunications network including a plurality of switches. Out-of-service data is gathered from each respective switch corresponding to a current time period for a plurality of trunks connected to the respective switch. Switches that have at least one out-of-service trunk are detected in response to the gathered data. A first plurality of graphic elements is displayed corresponding to respective switches, wherein each switch detected as having an out-of-service trunk is displayed with a distinguishing visual characteristic. One of the first graphic elements is manually selected for a selected switch. Second graphic elements are displayed for respective trunk groups corresponding to the selected switch, each second graphic element having a respective size proportional to a current number of call attempts directed to the respective trunk group during the current time period and having a color indicative of a health index of the respective trunk group.

DETAILED DESCRIPTION OF PREFERRED EMBODIMENTS

Figure 1:
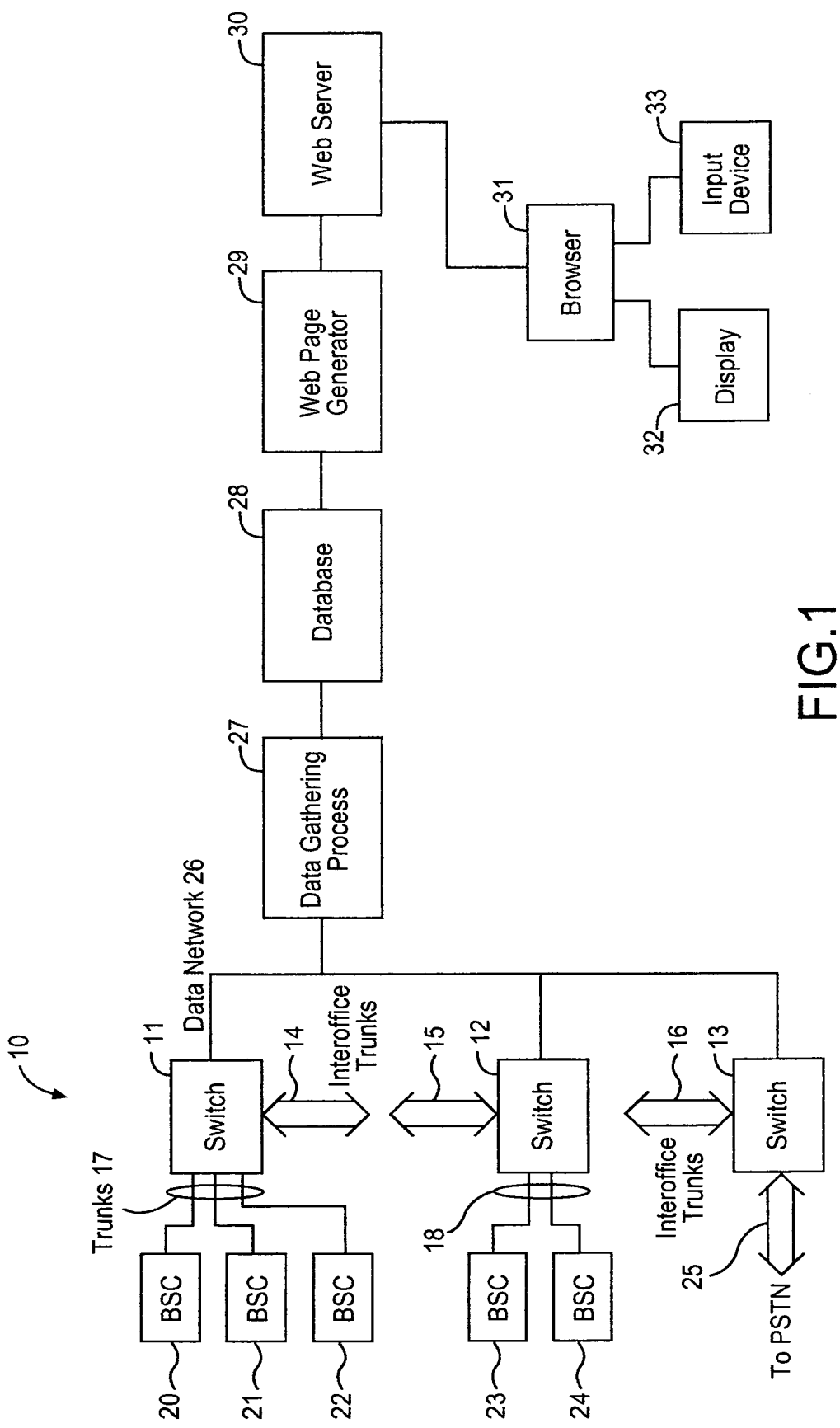
FIG. 1 is a block diagram of a telecommunications system according to the present invention.

Referring to FIG. 1, a telecommunications network 10 includes switches 11, 12, and 13. Switches 11-13 are interconnected by interoffice trunks 14, 15, and 16. Switches 11 and 12 may be comprised of mobile switching offices (MSOs) and be connected by trunks 17 and 18 to base station controllers (BSCs) 20-24, for example. Switch 13 may be a central office in the public switched telephone network (PSTN) and be connected to other switches or nodes in the PSTN by other trunk circuits 25.

Switches 11-13 are also interconnected by a data network 26 as part of an operational support system which may be managed from a control center (not shown). A data gathering process 27 is connected to all the network switches over data network 26 for gathering operational measurements that the switches automatically retain and stores the collected measurements in a database 28. A web page generator 29 is connected to database 28 for generating trunk monitoring web pages stored on a web server 30 for access via a browser 31. A user (e.g., a technician in a control center) interacts with browser 31 via a display 32 and an input device 33 (such as a keyboard and mouse) to check on the trunk health for all switches on the network, thereby allowing technicians to detect problems and to concentrate their efforts on the most significant problems that may exist.

Data gathering process 27 uses known techniques (e.g., switch manufacturer-specific) in order to collect switch operational measurements that are conventionally maintained by the switches and accessible using known network protocols. For each trunk group connected to a switch, the switch maintains a performance measurement for out-of-service minutes. If a trunk (i.e., one circuit) fails for an hour; the switch will report an out-of-service minutes value of 60.

Some switches may report this as 3600 out-of-service seconds or 36 centum call seconds (CCS). If a DS-1 span fails, then all 24 trunk circuits within it will be out of service but the switch will typically still compute a CCS. For example, if a DS-1 span fails for the full measurement interval, then 24 circuits are fully out of service. If the measurement interval is half an hour, then the out of service (OOS) value in hundred (i.e., centum) call seconds (CCS) equals 30 minutes times 60 second per minute times 24 circuits times 1 CCS per 100 seconds, or 432 CCS.

Other switch performance parameters that may be gathered include call attempts, call connection rate (CCR), and answer to seizure ratio (ASR), as well as trunk oriented performance perimeters such as number of trunks in a trunk group, number of call attempts directed to a trunk group, a number of overflows, a CCR, an ASR, system busy units (SBU) which is given in terms of CCS for circuits automatically detected as bad and put out of service by the switch, and manual busy units (MBU) which is given in terms of CCS for circuits manually put out of service. Performance parameters are typically reported for a current time period such as the previous half-hour. Web page generator 29 processes the performance data stored in database 28 and generates web pages for displaying trunk health index information in a user friendly display allowing a technician to identify problems with a quick visual inspection.

Figure 2:
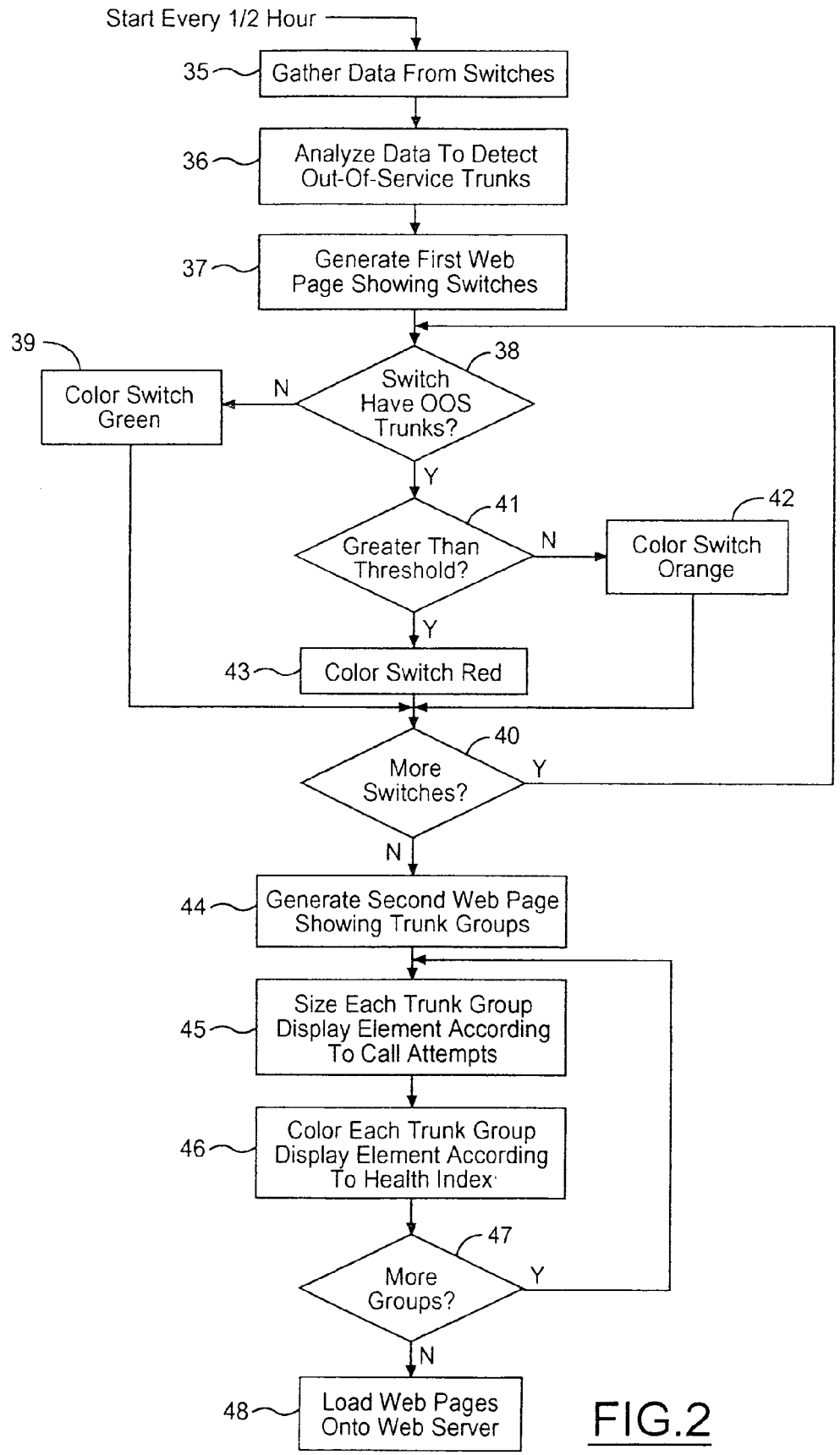
FIG. 2 is a flowchart of a preferred method of the invention.

One method of performing the present invention is shown in FIG. 2. At periodic intervals (such as each half hour), data is gathered from all the switches in the network in step 35. In step 36, the data is analyzed to detect switches that have out-of-service trunks. In a preferred embodiment, any switch having an out-of-service minutes or seconds value that is not equal to zero is determined to have out-of-service trunks. Alternatively, only switches having an out-of-service (OOS) minutes or seconds value greater than some threshold are detected. In particular, a threshold representing an outage of greater than or equal to one DS-1 span may be used. Assuming a half hour monitoring interval, an OOS CCS value of greater than or equal to 432 would indicate failures equivalent to a full DS-1 span.

In step 37, a first web page is generated showing all the switches in the network being monitored. The web page preferably includes a table or grid having corresponding entries or graphic elements for each switch labeled with a text name of the switch. Next, the trunk health of each switch is analyzed in order to provide each switch entry with a distinguishing visual characteristic to represent their status as having out-of-service trunks or not. For each switch in this example embodiment, a check is made in step 38 to determine whether the switch has out-of-service trunks (e.g., a non-zero value for CCS). If not, then a first graphic element representing the switch on the first web page is colored green, corresponding to no problems. Then a check is made in step 40 to determine if there are more switches. A return is made to step 38 to determine whether a remaining switch has an out-of-service trunk. If step 38 determines that the switch under consideration does have an out-of-service trunk, then a check may be made in step 41 to determine whether the magnitude of the trunk outage is greater than a predetermined threshold. The threshold may comprise a particular out-of-service minutes or seconds value (e.g., 432 CCS) or may be comprised of a percentage of total service minutes or second for the switch under consideration. If the outage is not greater than the threshold, then the graphic element for the corresponding switch is colored orange in step 42. Otherwise, the graphic element is colored red in step 43. Thus, by visually inspecting the graphic elements for a respective switch, it can be determined whether there are no outages, a first severity of outage, or a greater severity of outage based on the color of the graphic element corresponding to the switch. Of course, other colors or distinguishing visual characteristics such as icons could be employed as well as a greater or lesser number of trunk health levels (i.e., more than one threshold or no threshold at all). In another preferred embodiment, one threshold is selected and all switches with OOS CCS less than the threshold are shown as green and all with OOS CCS greater than the threshold are shown as red.

After all switches have been characterized in the first web page, the preferred method generates a second web page showing trunk group information in step 44. The second web page includes second graphic elements corresponding to each trunk group in a corresponding switch. Each trunk group may be a respective DS-1 span or group of DS-1 spans. Each second graphic element is sized in proportion to the number of call attempts directed to the trunk group. In step 46, the second graphic element corresponding to each trunk group is colored according to a health index (e.g., ranges of OOS CCS) thereby allowing a technician to determine which trunk groups on a switch may require attention. A check is made in step 47 to determine whether second graphic icons have been defined for all of the trunk groups in a switch. If not all trunk groups have been processes, then a return is made to step 45 to handle the next trunk group. Otherwise, the first and second web pages are loaded onto the web server in step 48.

Figure 3:
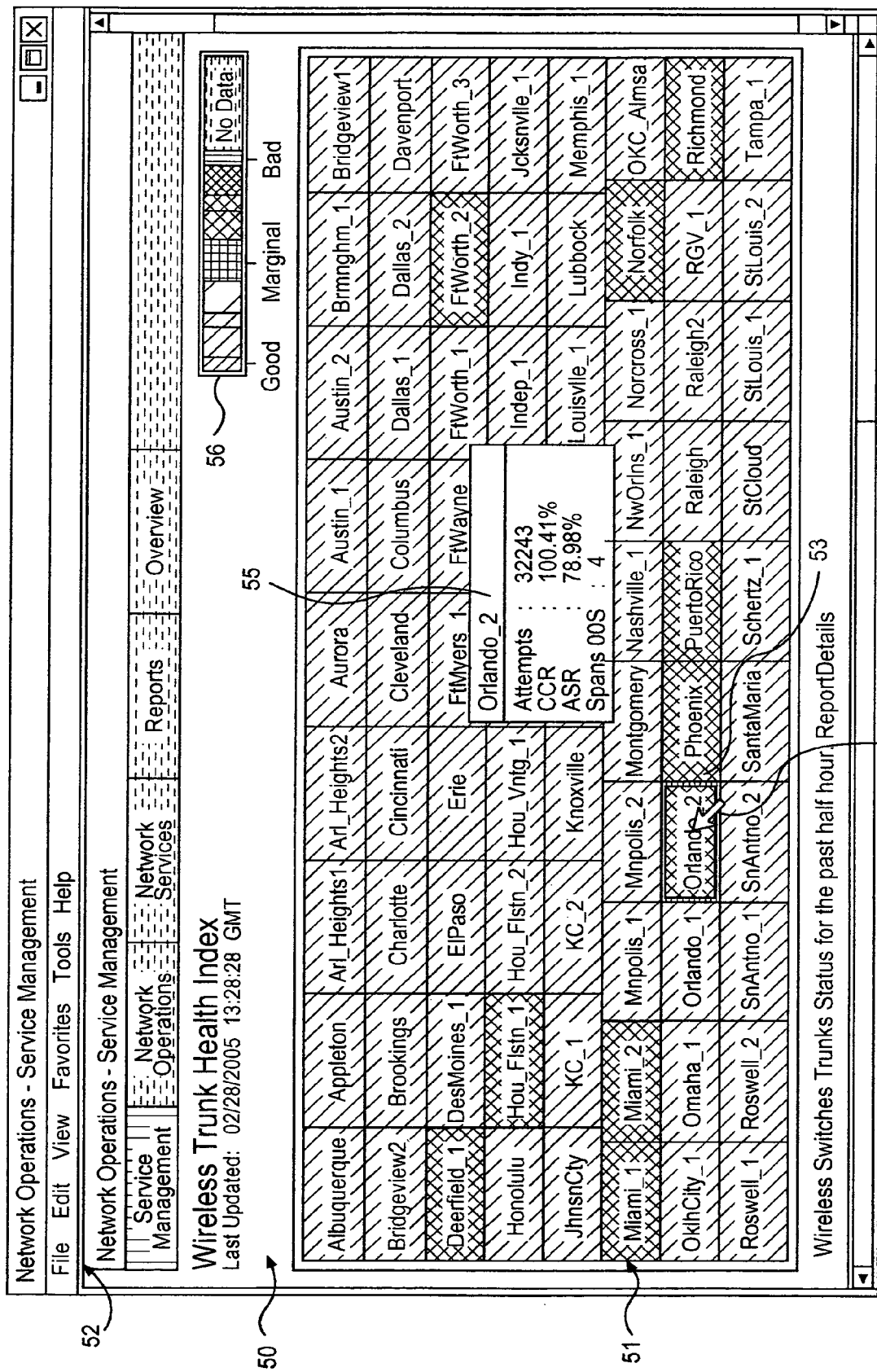
FIG. 3 is a screen shot showing first graphic elements of a web page of the present invention.

FIG. 3 shows a screen shot of a first web page including first graphic elements corresponding to a plurality of switches in the telecommunications network. Thus, a web page 50 includes a plurality of first graphic elements 51 displayed within a browser window 52. A text identifier appears in each graphic element which also includes a colored rectangle having a color chosen in response to the out-of-service trunks of the corresponding switch. For example, a graphic element 53 corresponding to a switch named "Orlando_2" is shown having a color indicative of the presence of out-of-service trunks. A mouse pointer 54 is shown to be positioned over graphic element 53 thereby invoking a pop-up box 55 displaying current switch performance parameters such as number of call attempts, call connection rate, answer to seizure ratio, and number of trunks or spans out-of-service. A color key 56 may be provided to for identifying the coloration chosen for switches having out-of-service trunks. A color key may be especially desirable if additional ranges of coloration versus number of out-of-service circuits are employed. A distinct color such as gray may be employed to indicate that no data is available from a particular switch due to a failure in the data gathering process.

Figure 4:
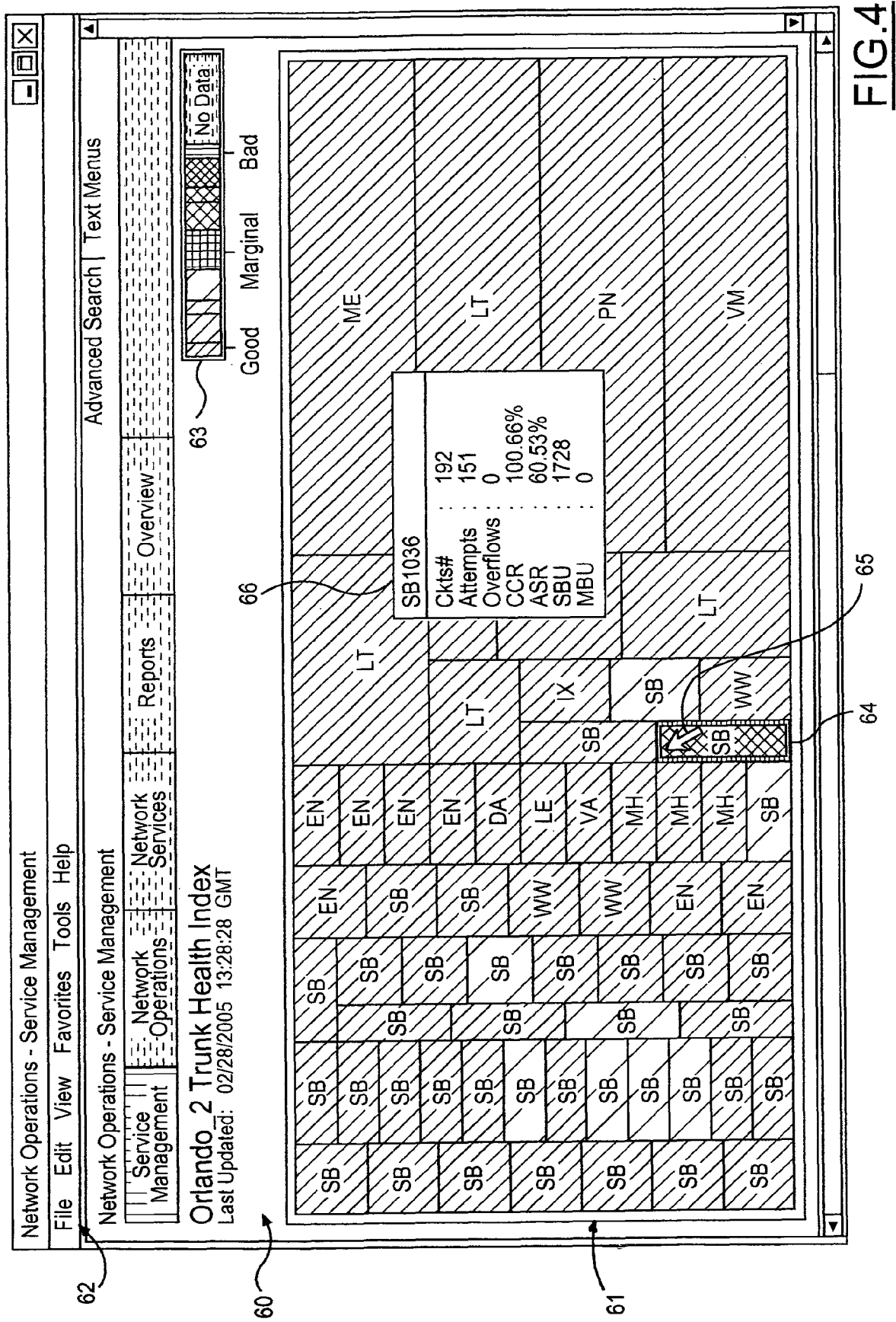
FIG. 4 is a screen shot showing second graphic elements of a web page of the invention.

FIG. 4 shows a second web page 60 including a plurality of second graphic elements 61 in a second browser window 62. Each second graphic element is a rectangle with a selected size (e.g., area) which is proportional to the number of call attempts directed to each trunk group corresponding to each graphic element. Thus, the busiest trunk groups correspond to the largest rectangles. Each second graphic element may preferably be labeled with a text identifier corresponding to the type of trunk group. Each second graphic element is colored according to a trunk health index such as the total out-of-service minutes or seconds or a percentage of capacity affected by out-of-service time. A color key 63 may again be provided for identifying good, marginal, and bad trunk health values. A second graphic element 64 has a color indicative of deficient trunk health and has a mouse pointer 65 positioned thereat. The mouse pointer invokes a pop-up box 66 displaying a summary of current trunk group performance parameters for the respective trunk group. Pop-up box 66 includes a text header providing a full name of the trunk group followed by parameter values including number of circuits or trunks in the group, call attempts, overflows, CCR, ASR, SBU, and MBU, or any other known performance parameters that may be desired.

In usage, the technician views a first web page to inspect all switches. If all switches are colored green, then there are no trunk health problems and the technician knows that no current efforts are needed to address any trunk related issues. For any trunks that are not colored green, the technician can view summary details by manipulating the mouse pointer over the first graphic element of a non-green switch to invoke the summary pop-up box to see current switch performance parameters. If these parameters show the technician that further investigation is warranted, the technician selects the graphic icon by clicking the mouse while pointing to the corresponding graphic element in order to go to the second web page of FIG. 4. The technician then visually inspects the health of individual trunk groups.

What is claimed is:

1. A method of monitoring trunks in a telecommunications network including a plurality of switches, said method comprising the steps of:
    gathering into a database from each respective switch, out-of-service data corresponding to a current time period for a plurality of trunks connected to said respective switch;
    detecting switches that have at least one out-of-service trunk in response to said gathered data;
    displaying on a display driven by a computer, a first window containing a plurality of first graphic elements corresponding to respective switches, wherein each first graphic element comprises non-textual visual characteristics, and wherein, wherein each first graphic element corresponding to a switch detected as having an out-of-service trunk has a non-textual visual characteristic that is different from said first graphic elements that correspond to switches detected as not having an out-of-service trunk;
    manually selecting on the display one of said first graphic elements for a selected switch detected as having an out-of-service trunk;
    in response to said step of manually selecting one of said first graphic elements, displaying on the display a second window containing a plurality of second graphic elements for respective trunk groups corresponding to said selected switch, each second graphic element having a respective size proportional to a current number of call attempts directed to said respective trunk group during said current time period and having a color indicative of a health index of said respective trunk group.

2. The method of claim 1 wherein said health index comprises a total out-of-service duration for trunks in said respective trunk group during said current time period and wherein said color is determined in response to said total out-of-service duration.

3. The method of claim 2 wherein said total out-of-service duration comprises out-of-service minutes and wherein said current time period comprises a half hour.

4. The method of claim 1 further comprising the steps of:
    gathering current switch performance parameters from said respective switches;
    manipulating a graphical pointer over said first graphic elements to invoke a summary pop-up box displaying said current switch performance parameters for a corresponding switch.

5. The method of claim 4 wherein said current switch performance parameters are selected from a group comprising call attempts, call connection rate, answer to seizure ratio, and number of trunks having out-of-service minutes.

6. The method of claim 1 further comprising the steps of:
    gathering current trunk group performance parameters from said respective switches;
    manipulating a graphical pointer over said second graphic elements to invoke a summary pop-up box displaying said current trunk group performance parameters for a corresponding trunk group.

7. The method of claim 6 wherein said current trunk group performance parameters are selected from a group comprising number of trunks included in said trunk group, said number of call attempts directed to said trunk group, a number of overflows, a call connection rate, an answer to seizure ratio, system busy units (SBU), and manual busy units (MBU).

8. The method of claim 1 wherein said non-textual visual characteristic of said plurality of first graphic elements is comprised of a plurality of colors, wherein said switches not detected as having an out-of-service trunk are displayed with a first color within said first window, and wherein said switches detected as having an out-of-service trunk are displayed in a second color within said first window.

9. The method of claim 1 wherein said non-textual visual characteristic of said plurality of first graphic elements is comprised of a plurality of colors, wherein said switches not detected as having an out-of-service trunk are displayed with a first color within said first window, wherein said switches detected as having a number of out-of-service trunks below a threshold are displayed in a second color within said first window, and wherein said switches detected as having a number of out-of-service trunks above said threshold are displayed in a third color within said first window.

10. The method of claim 1 wherein said step of manually selecting one of said first graphic elements comprises pointing a mouse cursor and clicking a mouse button.

11. The method of claim 1 wherein said telecommunications network includes a wireless cellular system and wherein said trunks connect said switches with cell sites in said wireless cellular system.

12. A trunk monitoring system for a telecommunications network wherein said network includes a plurality of switches connected to a plurality of trunks carrying voice signals, wherein said trunks are organized into trunk groups, and wherein said switches are coupled to a data network, said trunk monitoring system comprising:
    a data gathering application coupled to said switches via said data network for gathering from each respective switch out-of-service data corresponding to a current time period for a plurality of trunks connected to said respective switch,
    a web page generator coupled to said data gathering application for detecting switches that have at least one out-of-service trunk in response to said gathered data and generating a first web page including a plurality of first graphic elements corresponding to respective switches, wherein each first graphic element comprises non-textual visual characteristics, and wherein each first graphic element corresponding to a switch detected as having an out-of-service trunk has a non-textual visual characteristic that is different from said first graphic elements that correspond to switches detected as not having an out-of-service trunk; and
    a web server accessible by a web browser for displaying said plurality of first graphic elements as said first web page and for manually selecting one of said first graphic elements for a selected switch detected as having an out-of-service trunk;

wherein, in response to the manual selection of one of said first graphic elements, said web page generator further generates a second web page including a plurality of second graphic elements for respective trunk groups corresponding to said selected switch, each second graphic element having a respective size proportional to a current number of call attempts directed to said respective trunk group during said current time period and having a color indicative of a health index of said respective trunk group, and wherein said web server is further accessible by said web browser for displaying said second graphic elements as said second web page.

13. The trunk monitoring system of claim 12 wherein said telecommunications network includes a wireless cellular system and wherein said trunks connect said switches with cell sites in said wireless cellular system.

14. The trunk monitoring system of claim 12 wherein said health index comprises a total out-of-service duration for trunks in said respective trunk group during said current time period and wherein said color is determined in response to said total out-of-service duration.

15. The trunk monitoring system of claim 14 wherein said total out-of-service duration comprises out-of-service minutes and wherein said current time period comprises a half hour.

16. The trunk monitoring system of claim 12 wherein said web page generator gathers current switch performance parameters from said respective switches and wherein said web server is responsive to said web browser for manipulating a graphical pointer over said first graphic elements to invoke a summary pop-up box displaying said current switch performance parameters for a corresponding switch.

17. The trunk monitoring system of claim 16 wherein said current switch performance parameters are selected from a group comprising call attempts, call connection rate, answer to seizure ratio, and number of trunks having out-of-service minutes.

18. The trunk monitoring system of claim 12 wherein said web page generator gathers current trunk group performance parameters from said respective switches and wherein said web server is responsive to said web browser for manipulating a graphical pointer over said second graphic elements to invoke a summary pop-up box displaying said current trunk group performance parameters for a corresponding trunk group.

19. The trunk monitoring system of claim 18 wherein said current trunk group performance parameters are selected from a group comprising number of trunks included in said trunk group, said number of call attempts directed to said trunk group, a number of overflows, a call connection rate, an answer to seizure ratio, system busy units (SBU), and manual busy units (MBU).

20. The trunk monitoring system of claim 12 wherein said non-textual visual characteristic of said plurality of first graphic elements is comprised of a plurality of colors, wherein said switches not detected as having an out-of-service trunk are displayed with a first color on said first web page, and wherein said switches detected as having an out-of-service trunk are displayed in a second color on said first web page.

21. The trunk monitoring system of claim 12 wherein said non-textual visual characteristic of said plurality of first graphic elements is comprised of a plurality of colors, wherein said switches not detected as having an out-of-service trunk are displayed with a first color on said first web page, wherein said switches detected as having a number of out-of-service trunks below a threshold are displayed in a second color on said first web page, and wherein said switches detected as having a number of out-of-service trunks above said threshold are displayed in a third color on said first web page.

* * * * *